March 10, 1964  J. RADLOFF ETAL  3,123,853
APPARATUS FOR BEHEADING FISH, ESPECIALLY COD AND THE LIKE
Filed Aug. 4, 1960  2 Sheets-Sheet 1
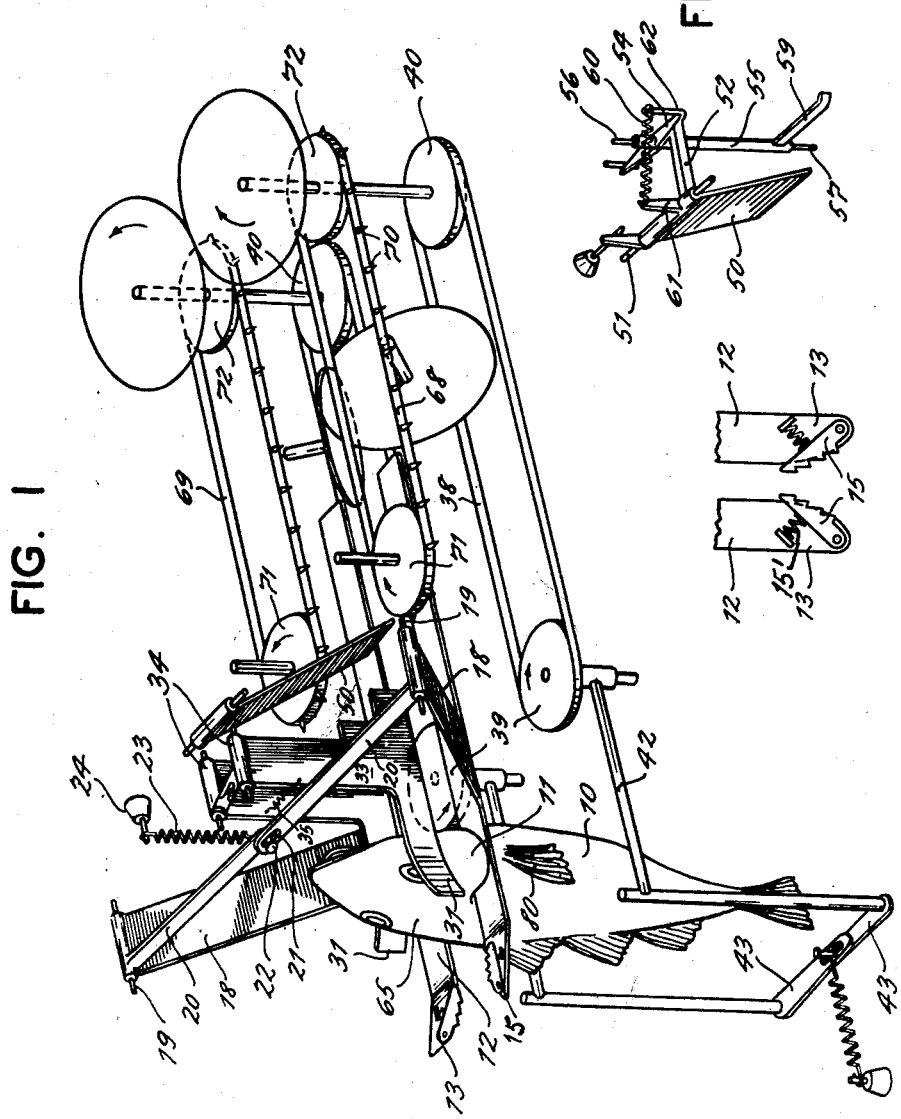

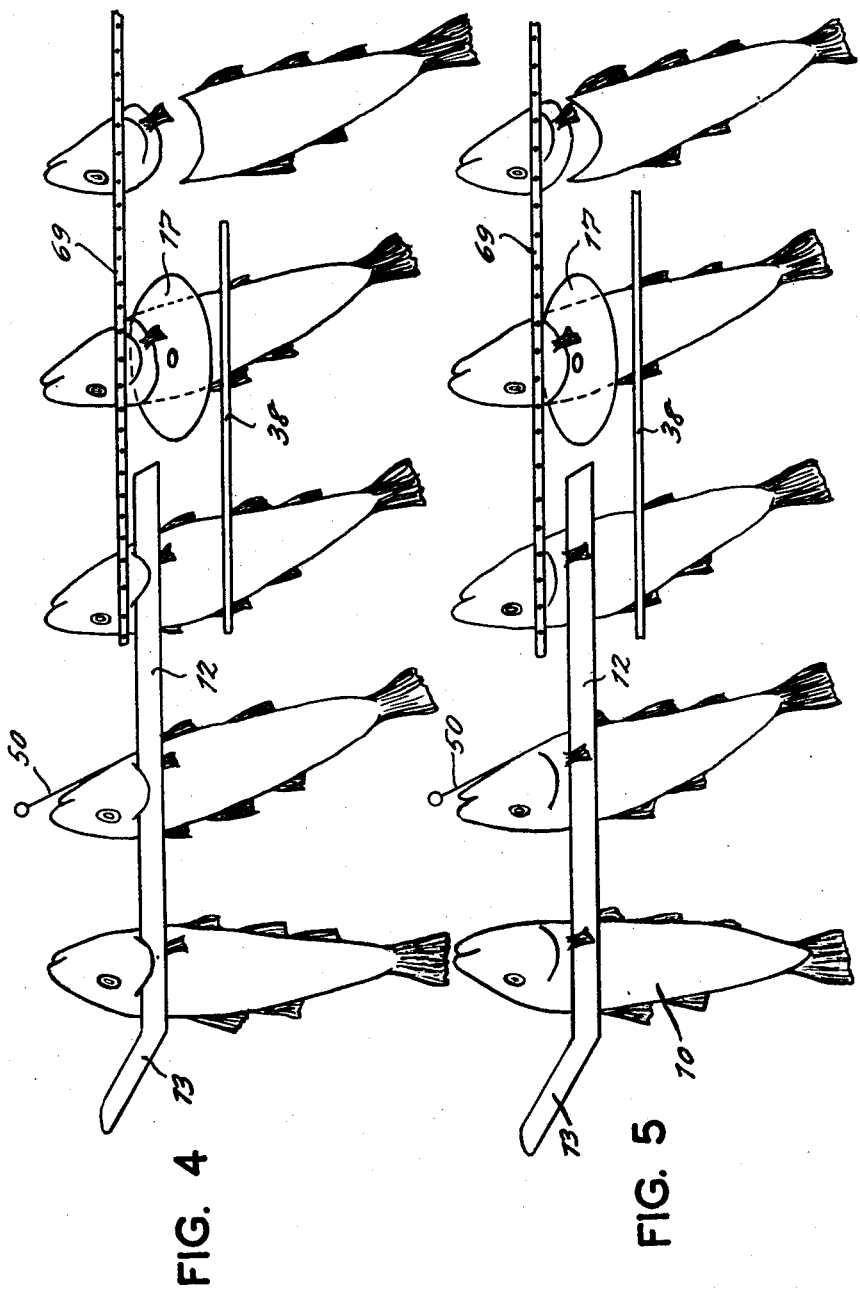

United States Patent Office 3,123,853
Patented Mar. 10, 1964

3,123,853
APPARATUS FOR BEHEADING FISH, ESPECIALLY COD AND THE LIKE
Johannes Radloff, Lubeck-Schlutup, and Karl Schlichting, Lubeck, Germany, assignors to Nordischer Maschinenbau Rud. Baader, Lubeck, Germany, a firm
Filed Aug. 4, 1960, Ser. No. 47,533
Claims priority, application Germany Aug. 7, 1959
10 Claims. (Cl. 17—4)

The invention relates to a method of beheading fish, especially cod and anatomically similar fish. Many such methods are known which aim at removing the head of the fish with the least possible loss of valuable flesh. This is difficult in the case of fish such as cod and the like, in which a large portion of valuable fish flesh extends in wedge-shape into the head. It has been endeavoured to carry out this most intricate operation in a satisfactory manner but these endeavours have failed either on account of the apparatus being too complicated and uneconomical or the saving of the valuable flesh was insufficient. In the latter case it was endeavoured to decapitate the fish hung by the gill covers or pectoral fins and held by the tail, with a wedge-shaped cut extending in arcuate form about its axis of suspension. It has, however, been found that the desired result is not obtained because the swinging of the fish guided by the tail is a complicated mechanical process and unreliable. Moreover the capacity of the apparatus is unsatisfactory because it is always only possible to introduce a second fish into the apparatus while the preceding fish is being beheaded.

The object of the invention is to overcome these objections and devise a method which enables the fish to be introduced into the apparatus in quick succession, to be then brought into the correct position for removing the head and beheaded with a straight cut at an angle to the longitudinal axis of the fish. According to the method forming the subject-matter of the invention, the fish is hung freely using the gill covers or pectoral fins as supporting points, carried forward hanging freely by exerting pressure on its body, the fish being then brought into a position with its symmetry plane in alignment with the symmetry plane of the beheading apparatus by engagement of the gill covers, it is then at an incline to the vertical and held in this inclined position by additional engagement by conveying mechanism in the region of the head, and is beheaded by a wedge-shaped cut. As the path of movement of the fish is absolutely straight and the fish is maintained in its inclined position by travelling conveying mechanisms, the charging of the apparatus can be said to take place on an endless band. Each fish hung in the apparatus by hand travels along its path of movement as soon as it is gripped by the conveying mechanisms engaging the body and in no way impedes the next following fish, no matter how close the sequence thereof is.

The apparatus for carrying out the method is mechanically simple and consequently very reliable in operation. It comprises primarily guides for the gill covers or pectoral fins of known type arranged in pairs and circular knives also of known type arranged at an incline to each other symmetrically to the symmetry plane of the apparatus. The method according to the invention requires a pair of conveying mechanisms engaging the body of the fish, a centering device engaging the gill covers for adjusting the symmetry plane of the fish to that of the apparatus, a tilting device in the path of movement of the fish capable of being locked and of being released by the fish, and a pair of conveying mechanisms engaging the head of the fish held in tilted position.

Endless belts are preferably provided as conveying mechanisms chiefly because they enable the number of fish passing simultaneously through the apparatus to be increased. The centering device preferably consists of a pair of yieldable flaps, whereas the tilting device consists of a flap located in the path of movement of the fish, capable of swinging out of this path and normally standing at an incline to the vertical. All guides and conveying mechanisms arranged in pairs are preferably synchronized. A feeler serves for releasing the tilting device and is connected with the locking mechanism of the device. The front ends of the pairs of guides supporting the fish by their gill covers or pectoral fins are bent upwards to facilitate the placing of the fish and provided with resilient fin erectors.

An embodiment of the apparatus for carrying out the method according to the invention is illustrated diagrammatically by way of example in the accompanying drawings in which:

FIG. 1 is a perspective view of the apparatus for beheading fish according to the present invention with the plate release mechanism omitted;

FIG. 2 is a detail view of the mechanism for tilting the fish;

FIG. 3 is a plan view illustrating a construction detail;

FIG. 4 shows a fish hung by the gill covers in different positions while passing through the apparatus; and FIG. 5 shows a fish hung by the pectoral fins in the same positions as in FIG. 4.

In FIGURE 1 a codfish 10 is shown already hanging tail downwards on the apparatus. The fish 10 is suspended by means of its gill covers 11 on a pair of spaced guides 12 having upturned ends 13 to facilitate the placing of the fish on the guides. FIG. 3 illustrates how each guide 12 has at its bent up ends a fin erector 15 which is spring loaded and only operative when a fish is suspended by its fins. The erectors 15 consist of levers pivotally mounted upon the guide ends 13 and maintained by springs 15' in positions wherein their toothed edges extend somewhat beyond the edges of the guides 12. Due to the upturned shape of the guide ends 13, the erectors 15 carried by these ends will engage under the gill covers 11 as the fish is being inserted between the guides 12, so that when the fish is moved somewhat beyond the ends 13, the gill covers 11 will be spread over the guides in the manner shown in FIG. 1.

The guides 12 extend forwards in a generally horizontal plane towards a pair of circular cutting knives 17 which are inclined to one another so that as the fish passes them they make a wedge-shaped cut. The guides 12 each have an upwardly and outwardly extending integral arm 18 which is pivoted at 19 to the frame of the machine (not shown). Extending inwards from each pivot and integral with each arm 18 are bars 20 having their inner ends overlapping and slotted at 21 to receive a pin 22 connected by a spring 23 to the frame at 24 so that the two guides can pivot apart or together in unison depending on the size of the fish, but at the same time maintain the fish aligned with the knives 17, because the movements of the parts 20 to 22 are accurately synchronized.

The inner edges of the guides 12 in practice swing up or down more or less in planes which are parallel to the knives 17.

The head of the fish is received between a pair of lateral supports in the form of vertical centering plates 30 having their rearward or entry ends 31 curved outwards to facilitate the guiding of the fish into position. Each plate 30 has an upper portion 33 pivoted at 34 to the frame and these portions are joined by a spring loaded connection at 35 and arranged to move in unison in a manner similar to the guides 12. Thus the plates 30 constitute a centering device.

Extending forwardly from the region of the plates 30 are a pair of endless belts 38, each of which runs over a pair of pulleys 39 and 40 having vertical axes, the pulleys 40 being driven by driving pulleys 73. The belts 38 are arranged to bear on the sides or flanks of the fish and carry them forwards to and past the cutting knives 17. The pulleys 39 have secured to their supports right-angled brackets 42 having inwardly extending arms 43 slotted and spring-loaded in a similar manner to the bars 20 of the guides 12 so that the two pulleys 39 are pressed inwards against the fish.

Situated in the path of the head of the fish just above the plates 12 is an inclined tilting plate 50 which is normally locked in the position shown by the mechanism illustrated in FIGURE 2. The tilting plate 50 is pivoted to the frame at 51 and has a latch arm 52 normally engaged by a latch 54 extending horizontally from a vertical post 55 which can turn about vertical pivots 56 and 57. Adjacent its lower end the post 55 has a release arm 59 extending from it into the path of the fish. A spring 60 extends between vertical members 61 and 62 secured respectively to the tilting plate 50 and the latch 54 to retain the mechanism normally in the latched position.

Thus as the fish is moved by the belts 38 against the tilting plate 50 it is tilted so that its head is inclined backwardly substantially into the position shown in FIGURE 4. As shown in FIG. 2, the plate 50 is in its locked position when the head of the fish strikes it. The body of the fish continues to be moved forwardly by the belts 38 so that the fish assumes the inclined position shown in the second illustration from the left in FIG. 4. The fish will strike the release arm 59, swinging it along with the post 55. The post 55 then releases the arm 52 from the latch 62. Then the arm 52 is free to swing with the plate 50, so that the fish is free to move forward. As soon as the fish has passed the plate 50, the plate will swing back into the locked position shown in FIG. 2 due to the spring 60. In the tilted position the part 65 on the dorsal side of the fish is swung downwards into the path of the knives so that the valuable flesh located at this part remains on the body after the head has been severed.

The head is retained and moved forward in this tilted position by a further pair of belts 68 and 69 having projections 70 and running over pulleys 71 and 72, the latter being driven by the pulleys 73 which also drive the pulleys 40 of the belts 38.

As shown in FIGURES 1 and 4, the fish is suspended on the guides 12 by the gill covers 11 but it may equally well be suspended by its pectoral fins 80 as shown in FIGURE 5. As the head of the fish is slightly higher, only the parts 12, 17, 38 and 68, 69 need be adjustable in height in relation to each other. This is preferably effected by adjusting the height of the parts 12 and 17.

We claim:

1. Apparatus for beheading fishes, especially of the cod and similar species, comprising a pair of guides for supporting the fish hanging freely tail downwards and having fish-receiving front ends and rear ends, a pair of circular knives arranged at an incline to each other symmetrically to the symmetry plane of the guides between the front ends and the rear ends of the guides, a pair of conveying mechanisms located under said guides for engaging the body of the fish supported on said guides to move it along said guides, a centering device operatively associated with said guides for engaging the gill covers of the fish to adjust the symmetry plane of the fish to that of the guides, a tilting device arranged above said guides between said centering device and said knives in the path of movement of the fish to incline the fish to the vertical, said tilting device being normally locked, means operated by the fish for releasing said tilting device, and a second pair of conveying mechanisms located above said guides for engaging the head of the fish while it is in tilted position and carrying it to and past the pair of circular knives.

2. Apparatus as set forth in claim 1, wherein endless belts are provided as conveying mechanisms.

3. Apparatus as set forth in claim 1, wherein the centering device is composed of a pair of plates.

4. Apparatus as set forth in claim 1, wherein the tilting device consists of a plate adapted to swing out of the path of the fish.

5. Apparatus as set forth in claim 1, wherein the pair of guides have swing arms synchronized with the conveying mechanisms.

6. Apparatus as set forth in claim 1, wherein a feeler is provided in the path of movement of the fish and connected to the tilting device by means of a locking mechanism.

7. Apparatus as set forth in claim 1, wherein the guides are bent upwards at their front ends to facilitate the placing of the fish.

8. Apparatus as set forth in claim 1, wherein the guides are provided at their front ends with spring-loaded fin elevators.

9. An apparatus for beheading cod and similar fish, comprising, in combination, a pair of spaced horizontal guides adapted to engage the fins of a fish suspended by and between the guides, said guides having fish-receiving front ends and rear ends, means connected with said guides for adjusting the position of the guides to the size of the fish, vertical centering plates operatively associated with said guides and adapted to engage the head of the fish from opposite sides, means connected with said vertical plates for adjusting the positions of the vertical plates, a pair of circular symmetrically inclined head-severing knives located between the front ends and the rear ends of said guides, two pairs of endless belts extending under said guides substantially between said vertical plates and the rear ends of said guides and adapted to engage the sides of the fish for transporting the fish along said guides, means connected with said endless belts for adjusting the position of the endless belts to the size of the fish, a pivoted tilting plate located above said guides in the path of the head of the fish between said vertical plates and said circular knives, said tilting plate being inclined in the direction toward said circular knives, means locking said tilting plate and adapted to be engaged and operated by the moving fish for releasing said tilting plate, and two other pairs of movable endless belts extending above said guides substantially between said circular knives and the rear ends of said guides for engaging and transporting the severed head of the fish.

10. An apparatus for beheading cod and similar fish, comprising, in combination, a pair of spaced horizontal guides adapted to engage the fins of a fish suspended by and between the guides, said guides having fish-receiving front ends and rear ends, swingable fin erectors carried by said front ends, springs engaging said fin erectors, outwardly inclined arms connected with said guides, bars connected with said arms and having overlapping slotted inner ends, a pin extending through the slots of said inner ends, a spring connected with said pin for adjusting the position of the guides to the size of the fish, vertical centering plates having upper pivoted portions and lower portions located above said guides and adapted to engage the head of the fish from opposite sides, a spring extending between said vertical plates and connected therewith, a pair of circular symmetrically inclined head-severing knives located between the front ends and the rear ends of said guides, two pairs of endless belts extending under said guides substantially between said vertical plates and the rear ends of said guides and adapted to engage the sides of the fish for transporting the fish along said guides, pulleys carrying said belts, brackets connected with two pulleys carrying different belts, arms connected with said brackets and having overlapping slotted inner ends, a pin extending through the slots of said inner ends, a spring connected with the last-mentioned pin for adjusting the position of the endless belts to the size of the fish, a pivoted tilting plate located above said guides in the path of the head of the fish between said vertical plates and said circular knives, said tilting plate being inclined in the direction toward said circular knives, a latch arm connected with said tilting plate, a swingable latch adapted to engage said latch arm for maintaining said tilting plate in a locked postion, a post carrying said latch and swingable therewith, a release arm carried by said post and extending into the path of the fish, whereby the moving fish releases said latch, a spring connected with said tilting plate and said latch for returning said tilting plate into said locked position, and two other pairs of movable endless belts extending above said guides substantially between said circular knives and the rear ends of said guides for engaging and transporting the severed head of the fish.

References Cited in the file of this patent

UNITED STATES PATENTS

| | | |
|---|---|---|
| 2,423,174 | Brown | July 1, 1947 |
| 2,920,343 | Bartels et al. | Jan. 12, 1960 |
| 2,959,810 | Cameron | Nov. 15, 1960 |
| 2,961,697 | Schlichting | Nov. 29, 1960 |